UNITED STATES PATENT OFFICE 2,583,084

HYDROCARBON TIN ALCOHOLATES

Samuel L. Burt, Plainfield, N. J., assignor, by mesne assignments, to Union Carbide and Carbon Corporation, a corporation of New York No Drawing. Application December 15, 1948,
Serial No. 65,521

3 Claims. (Cl. 260—429)

This invention provides an improved method for making the hydrocarbon tin alcoholates.

Hydrocarbon tin alcoholates may be made at present by an expensive process involving the reaction of a dialkyl tin dibromide with a sodium alcoholate. I have discovered a cheaper and more effective process. According to this invention, hydrocarbon tin alcoholates are prepared by reacting a dialkyl or diaryl tin oxide directly with an alcohol. In this process, there is no consumption of expensive reagents, as occurs in the previous process, wherein two moles of bromine and two moles of sodium are consumed for each mole of tin alcoholate formed. The reaction which occurs in the process of the invention may be represented for monohydric alcohols as follows:

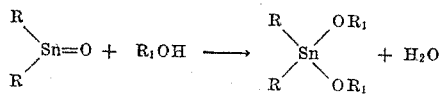

where R is an alkyl radical, such as a methyl, ethyl, isopropyl, butyl, 2-ethylbutyl or 2-ethylhexyl radical, or an aryl radical, such as a phenyl or toluyl radical and $R_1$ is the residue of an alcohol.

The reaction of the present invention is a general one, and by means of this reaction it is possible to prepare hydrocarbon tin alcoholates of a number of alcohols, which are difficult if not impossible to prepare by the prior art method. Thus, it is possible to prepare hydrocarbon tin alcoholates of polyhydric alcohols by this new method. The reaction which occurs between the hydrocarbon tin oxide and polyhydric alcohols may be represented as follows:

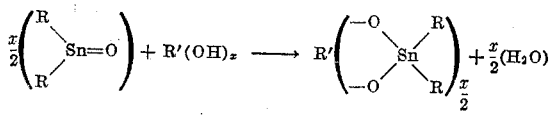

where $x$ is an integer having a value of 2 or higher and in $R'(OH)_x$ it represents the number of hydroxyl groups in the polyhydric alcohol, $R'$ is the residue of a polyhydric alcohol and R is a hydrocarbon radical, such as an alkyl or aryl group.

The reaction between the hydrocarbon tin oxide and the alcohol may be carried out by heating the two reactants in a flask. The removal of the water of reaction is facilitated by carrying out the reaction in the presence of a water-immiscible organic diluent, such as a hydrocarbon or an ether, and refluxing the contents of the flask to remove the water and the diluent as a distillate. If desired, the water may be decanted from the condensed distillate and the organic diluent which separates returned to the reaction vessel.

The following examples will illustrate the invention:

Example 1

One mole (249 grams) of anhydrous dibutyl tin oxide was mixed with one mole (62 grams) of ethylene glycol and 300 milliliters of methyl cyclohexane in one-liter round bottom, Pyrex flask having three necks. The flask was provided with a mechanical agitator and reflux condenser.

Heat was applied to the flask and the contents brought to the boiling point. At the time reflux had started, the contents of the flask became homogeneous. After heating for two hours under reflux, the contents of the flask were cooled to about 50° C. and then transferred to a one-liter, Pyrex autoclave. The autoclave was evacuated to about 50 millimeters of mercury, absolute pressure, and was heated by means of a boiling water bath until only a solid residue remained. This solid was removed from the autoclave, crushed to a powder and residual solvent removed by heating the solid in a vacuum oven at 75° to 100° C. and 2 to 5 millimeters of mercury pressure, absolute, for a period of two hours. The product, $(C_4H_9)_2Sn(OC_2H_4O)$, melted at 195° to 200° C.

Examples 2 to 8

By a procedure similar to that of Example 1, the dibutyl tin alcoholates of the following alcohols were prepared, using for each mole of dibutyl tin oxide $2/x$ moles of alcohol, $x$ being the number of hydroxyl groups per molecule of the alcohol. The alcohol used in each preparation, and certain properties of the tin alcoholates found are listed below:

| Example No. | Alcohol | Melting point of Alcoholate |
|---|---|---|
| | | ° C. |
| 2 | allyl alcohol | |
| 3 | butyl alcohol | 110-115 |
| 4 | diethylene glycol | 120-130 |
| 5 | benzyl alcohol | |
| 6 | furfuryl alcohol | |
| 7 | decyl alcohol | |
| 8 | pentaerythritol | 125-128 |

All of these alcoholates are useful as heat stabilizers for vinyl chloride resins, but of them the dibutyl tin alcoholates of furfuryl alcohol and benzyl alcohol are outstanding, as described in my copending application, Serial No. 65,522, entitled "Stabilized Vinyl Chloride Resins," now Patent No. 2,489,518.

What is claimed is:

1. A dibutyl tin alcoholate of an aliphatic polyhydric primary alcohol containing from 2 to 5 carbon atoms and from 2 to 4 hydroxyl groups.

2. The dibtuyl tin alcoholate of ethylene glycol.

3. Process for making a dialkyl tin alcoholate which comprises heating a dialkyl tin oxide with an aliphatic primary polyhydric alcohol, removing water from the reaction zone during said heating, and recovering a hydrocarbon tin alcoholate of said alcohol.

SAMUEL L. BURT.

REFERENCES CITED

The following references are of record in the file of this patent:

Harada, Sci. Papers Inst. Phy. and Chem. Research (Tokyo) vol. 35 (1939), page 304.